US007904921B2

(12) United States Patent
Yun et al.

(10) Patent No.: US 7,904,921 B2
(45) **Date of Patent: *Mar. 8, 2011**

(54) METHOD OF PROCESSING BROADCAST SIGNAL ASSOCIATED WITH EMERGENCY ALERT SYSTEM IN TERRESTRIAL BROADCASTING AND BROADCAST RECEIVER FOR THE SAME

(75) Inventors: Chang Sik Yun, Seoul (KR); Jin Pil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 28 days.

This patent is subject to a terminal disclaimer.

(21) Appl. No.: 11/984,691

(22) Filed: Nov. 20, 2007

(65) Prior Publication Data

US 2008/0141300 A1 Jun. 12, 2008

(30) Foreign Application Priority Data

Nov. 22, 2006 (KR) ........................ 10-2006-0115623

(51) Int. Cl.
*H04N 7/10* (2006.01)
*H04N 7/025* (2006.01)

(52) U.S. Cl. ................. 725/33; 725/67; 725/68; 725/70; 725/71; 340/286.02; 455/404.1

(58) Field of Classification Search .................... 725/33, 725/67–68, 70–71; 340/286.02; 455/404.1
See application file for complete search history.

(56) References Cited

U.S. PATENT DOCUMENTS 4,656,629 A * 4/1987 Kondoh et al. ............... 370/522
5,659,366 A * 8/1997 Kerman .......................... 725/34
6,020,913 A * 2/2000 Bush et al. ...................... 725/33
6,204,761 B1 * 3/2001 Vanderable .............. 340/539.28
6,543,051 B1 * 4/2003 Manson et al. ................. 725/33
7,038,581 B2 * 5/2006 Kendall et al. ................ 340/506
7,054,612 B2 * 5/2006 Patel .......................... 455/404.1
7,159,230 B2 * 1/2007 Manson et al. ................. 725/33
7,444,657 B2 * 10/2008 Kendall et al. .................. 725/33
7,454,773 B2 * 11/2008 Pugel et al. ..................... 725/33
7,506,349 B2 * 3/2009 Rodolico ........................ 725/33
2002/0157101 A1 * 10/2002 Schrader et al. ................ 725/64
2003/0093788 A1 * 5/2003 Takenaka ........................ 725/33
2003/0121036 A1 * 6/2003 Lock et al. ...................... 725/33
2005/0086685 A1 * 4/2005 Rahman et al. ................. 725/33
2005/0118984 A1 * 6/2005 Akiyama et al. ........... 455/404.2
(Continued)

FOREIGN PATENT DOCUMENTS

CN 1722801 1/2006
(Continued)

OTHER PUBLICATIONS

Society of Cable Telecommunications Engineers (SCTE), Emergency Alert Message for Cable, Dec. 2002, ANSI, J-STD0042, All Pages.*

(Continued)

*Primary Examiner* — Jason P Salce

(74) *Attorney, Agent, or Firm* — McKenna Long & Aldridge LLP

(57) ABSTRACT

A broadcast signal associated with an emergency alert system in terrestrial broadcasting, a processing method thereof, and a broadcast receiver for the same are disclosed, by which information on a channel for carrying emergency alert news can be completely prevented from being overlapped with information on other general channels in a terrestrial broadcasting environment.

8 Claims, 5 Drawing Sheets

| Field Name | Eits | Description |
|---|---|---|
| EAT_channel_descriptor() { | | |
| descriptor_tag | 8 | value 0xEA |
| descriptor_length | 8 | uimsbf |
| details_majer_channel_number | 16 | uimsbf |
| details_minor_channel_number | 16 | uimsbf |
| carrier_frequency | 32 | uimsbf |
| details_channel_programNumber | 8 | uimsbf |
| details_channel_tsID | 16 | uimsbf |
| } | | |

U.S. PATENT DOCUMENTS

| | | | | |
|---|---|---|---|---|
| 2005/0212504 | A1* | 9/2005 | Revital et al. | 324/100 |
| 2006/0005219 | A1* | 1/2006 | Owens | 725/33 |
| 2006/0015916 | A1 | 1/2006 | Yun | |
| 2006/0020959 | A1* | 1/2006 | Masuda | 725/25 |
| 2006/0048180 | A1* | 3/2006 | Kendall et al. | 725/33 |
| 2006/0059512 | A1* | 3/2006 | Pugel | 725/33 |
| 2006/0159128 | A1* | 7/2006 | Chen et al. | 370/486 |
| 2007/0118861 | A1* | 5/2007 | Stone | 725/80 |
| 2007/0157209 | A1* | 7/2007 | Hashimoto et al. | 718/104 |
| 2007/0242783 | A1 | 10/2007 | Nishi | |
| 2008/0046524 | A1* | 2/2008 | Jerding et al. | 709/206 |

FOREIGN PATENT DOCUMENTS

| | | |
|---|---|---|
| EP | 1 619 895 | 1/2006 |
| WO | WO2006035812 | 4/2006 |

OTHER PUBLICATIONS

"Specification of Service Information for Digital Television Broadcasting" Jianping Mei Standardization Planning Institute of the State Administration of Radio Film and Televison, 7, 22 and 49-50 of the Description, GY/Z 174-2001, Sep. 18, 2001, 99 pages.

* cited by examiner

FIG. 1

| Syntax | Bits | Description |
|---|---|---|
| table_ID | 8 | value 0xD8 |
| section_syntax_indicator | 1 | '1' |
| zero | 1 | '0' |
| reserved | 2 | '11' |
| section_length | 12 | uimsbf |
| table_id_extension | 16 | '0x0000' |
| reserved | 2 | '11' |
| sequence_number | 5 | uimsbf |
| current_next_indicator | 1 | bslibf |
| section_number | 8 | uimsbf |
| protocol version | 8 | uimsbf |
| last_section_number | 8 | uimsbf |
| EAS_originator_code | 24 | Three ASCII characters |
| EAS_event_code_length | 8 | uimsbf(N) |
| EAS_event_code | 8+N | N ASCII characters |
| nature_of_activation_text_length | 8 | uimsbf |
| nature_of_activation_text() | 8 | uimsbf |
| alert_message_time_remaining | var | uimsbf range 0~120 |
| event_start_time | 32 | uimsbf |
| event_duration | 16 | uimsbfr range 15~60000 |
| reserved | 12 | bslibf |
| alert_priority | 4 | uimsbf |
| reserved | 4 | "1111' |
| alert_text_length | 16 | uimsbf |
| alert_text() | var | var |
| location_code_count | 8 | uimsbf |
| for(I=0;I<location_code_count;I++) | | |
| { | | |
| state_code | 8 | uimsbf 0~99 |
| state_subdivision_code | 8 | uimsbf 0~99 |
| county_code | 8 | uimsbf 0~99 |
| } | | |
| excetion_count | 8 | uimsbf |
| for(I=;I<exception_count;I++) { | | |
| exception_major_channel_number | 16 | uimsbf |
| exception_minor_channel_number | 16 | uimsbf |
| } | | |
| reserved | 6 | '111111' |
| description_length | 10 | iimsbf |
| for(I=0;I<N;I++) { | | |
| descriptor() | var | Optional |
| } | | |
| CRC_2 | 32 | |

FIG. 2

| Field Name | Eits | Description |
|---|---|---|
| EAT_channel_descriptor() { | | |
| descriptor_tag | 8 | value 0xEA |
| descriptor_length | 8 | uimsbf |
| details_majer_channel_number | 16 | uimsbf |
| details_minor_channel_number | 16 | uimsbf |
| carrier_frequency | 32 | uimsbf |
| details_channel_programNumber | 8 | uimsbf |
| details_channel_tsID | 16 | uimsbf |
| } | | |

METHOD OF PROCESSING BROADCAST SIGNAL ASSOCIATED WITH EMERGENCY ALERT SYSTEM IN TERRESTRIAL BROADCASTING AND BROADCAST RECEIVER FOR THE SAME

This application claims the benefit of the Korean Patent Application No. 10-2006-0115623, filed on Nov. 22, 2006, which is hereby incorporated by reference as if fully set forth herein.

BACKGROUND OF THE INVENTION

1. Field of the Invention

The present invention relates to an emergency alert system, and more particularly, to a broadcast signal associated with an emergency alert system in terrestrial broadcasting, a processing method thereof, and a broadcast receiver for the same.

2. Discussion of the Related Art

Recently, natural disasters including unexpected earthquakes and floods or emergency situations including terrors, arsons and the like tend to take place more frequently. Natural disasters due to environmental pollution or terrors cause more damages widely and their secondary effects become more powerful.

In case that one of the above-illustrated emergencies takes place, the coverage of the emergency is filed. News relating to the emergency is then broadcasted in a format such as a newsflash and the like on all channels after a prescribed duration.

Particularly, basic protocol for processing an emergency alert system message has been determined for televisions and the like for sale in North America. And, a basic protocol for receiving and processing an emergency alert system message correctly is determined for cable digital TVs as well.

However, in case that the emergency alert system message defined in the specifications of cable digital TV, e.g., an emergency alert table (hereinafter abbreviated EAT) is intactly applied to a terrestrial broadcasting system, the following problems rise.

First of all, in case of applying an EAT defined for a related art cable digital broadcasting environment to a terrestrial broadcasting system, information on a channel for carrying emergency alert news may be duplicated instead of being unified.

For instance, in case of a cable broadcasting system in which a single broadcasting station is capable of managing all channels, channel numbers of all channels broadcasted in-band can be managed using a major channel number (physical channel number) and a minor channel number (program number) only. Yet, in case of terrestrial broadcasting, there exist a plurality of terrestrial broadcasting stations separately. So, a channel number of a channel broadcasted by each of the broadcasting stations can be arbitrarily set. So, the identical major and minor channel numbers may be used by different broadcasting stations.

Secondly, in case of applying the EAT defined in the related art cable digital broadcasting environment to a terrestrial broadcasting system, a relay service provider is able to change a frequency of a channel for carrying emergency alert news arbitrarily in retransmitting the EAT. So, although an emergency takes place, a receiver may be substantially tuned to a channel differing from the initially intended channel for carrying the emergency alert news.

SUMMARY OF THE INVENTION

Accordingly, the present invention is directed to a broadcast signal associated with an emergency alert system in terrestrial broadcasting, processing method thereof, and broadcast receiver for the same that substantially obviate one or more problems due to limitations and disadvantages of the related art.

An object of the present invention is to provide a broadcast signal associated with an emergency alert system in terrestrial broadcasting, a processing method thereof, and a broadcast receiver for the same, by which information on a channel for carrying emergency alert news can be completely prevented from being overlapped with information on other general channels in a terrestrial broadcasting environment.

Another object of the present invention is to provide a broadcast signal associated with an emergency alert system in terrestrial broadcasting, a processing method thereof, and a broadcast receiver for the same, by which an initially intended channel carrying emergency alert news can be substantially tuned to in case of an emergency occurrence in a manner that frequency information on a channel carrying emergency alert news is designed to be modified in accordance with a predetermined reference despite that a relay service provider retransmits an emergency associated broadcast signal (e.g., EAT, etc.) having been transmitted by a terrestrial broadcasting station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a terrestrial broadcast signal including an EAT, a broadcast signal associated with an emergency alert of a terrestrial broadcast according to the present invention includes a channel number information of the terrestrial broadcast transmitting an emergency alert news decided in accordance with a preset reference and frequency information of the terrestrial broadcast transmitting the emergency alert news decided in accordance with the preset reference.

Preferably, the channel number information of the terrestrial broadcast includes information for defining a major channel number of the terrestrial broadcast and a minor channel number of the terrestrial broadcast.

Preferably, the EAT includes at least one selected from the group consisting of program number information within a frequency for transmitting the emergency alert news and per contents transport stream ID information of the emergency alert news.

Preferably, the channel number information of the terrestrial broadcast transmitting the emergency alert news decided in accordance with the preset reference and the frequency information of the terrestrial broadcast transmitting the emergency alert news decided in accordance with the preset reference are defined by a channel descriptor of the EAT.

In another aspect of the present invention, a method of processing a broadcast signal associated with an emergency alert of a terrestrial broadcast according to the present invention includes the steps of receiving an emergency alert table (EAT) including a channel number information of the terrestrial broadcast transmitting an emergency alert news decided in accordance with a preset reference and frequency information of the terrestrial broadcast transmitting the emergency alert news decided in accordance with the preset reference, parsing the channel number information and the frequency information of the terrestrial broadcast transmitting the emergency alert news from the received EAT, and tuning to a predetermined channel for transmitting the emergency alert news in accordance with the parsed channel number information and the parsed frequency information.

In another aspect of the present invention, a method of processing a broadcast signal associated with an emergency alert of a terrestrial broadcast, in which the broadcast signal associated with the emergency alert is transmitted by a terrestrial broadcasting station and is then retransmitted by a relay service provider, according to the present invention includes the steps of receiving an emergency alert table (EAT) including a channel number information of the terrestrial broadcast transmitting an emergency alert news decided in accordance with a preset reference and frequency information of the terrestrial broadcast transmitting the emergency alert news decided in accordance with the preset reference from the terrestrial broadcasting station, modifying the frequency information of the received EAT in accordance with a protocol for mapping frequency information of the terrestrial broadcasting station for transmitting a specific terrestrial broadcast to frequency information of the relay service provider for transmitting the specific terrestrial broadcast, and transmitting the EAT including the modified frequency information to a broadcast receiver.

In another aspect of the present invention, in a digital broadcast receiver, a broadcast receiver for processing a broadcast signal associated with an emergency alert of a terrestrial broadcast according to the present invention includes a tuner unit receiving an emergency alert table (EAT) including a channel number information of the terrestrial broadcast transmitting an emergency alert news decided in accordance with a preset reference and frequency information of the terrestrial broadcast transmitting the emergency alert news decided in accordance with the preset reference, a parsing unit parsing the channel number information and the frequency information of the terrestrial broadcast transmitting the emergency alert news from the received EAT, and a control unit tuning to a predetermined channel for transmitting the emergency alert news in accordance with the parsed channel number information and the parsed frequency information.

In another aspect of the present invention, in a digital broadcast receiver capable of receiving a broadcast signal associated with an emergency alert from a relay service provider, a broadcast receiver for processing the broadcast signal associated with the emergency alert of a terrestrial broadcast according to the present invention includes a tuner unit receiving an EAT including frequency information modified in accordance with a protocol for mapping frequency information of the terrestrial broadcasting station for transmitting a specific terrestrial broadcast to frequency information of the relay service provider for transmitting the specific terrestrial broadcast, a parsing unit parsing the channel number information and the frequency information of the terrestrial broadcast transmitting the emergency alert news from the received EAT, and a control unit tuning to a predetermined channel for transmitting the emergency alert news in accordance with the parsed channel number information and the parsed frequency information.

Accordingly, specifications of an emergency alert system message (e.g., EAT) used in North America Cable Digital Broadcasting Environment can be expanded to a terrestrial broadcasting environment. Based on this, if they are expanded to terrestrial retransmissions later, an emergency situation can be accurately broadcasted through the terrestrial broadcasting. Hence, the emergency can be appropriately handled and damages caused by the emergency can be considerably reduced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to pro vide a further understanding of the invention and are incorporated in and constitute a part of this application, illustrate embodiment(s) of the invention and together with the description serve to explain the principle of the invention. In the drawings:

FIG. 1 is an exemplary diagram of a bit stream syntax of an emergency alert table (EAT) newly defined by terrestrial broadcasting according to the present invention;

FIG. 2 is an exemplary diagram of an EAT channel descriptor (EAT_channel_descriptor) newly defined by terrestrial broadcasting according to the present invention;

DETAILED DESCRIPTION OF THE INVENTION

Figure 3:
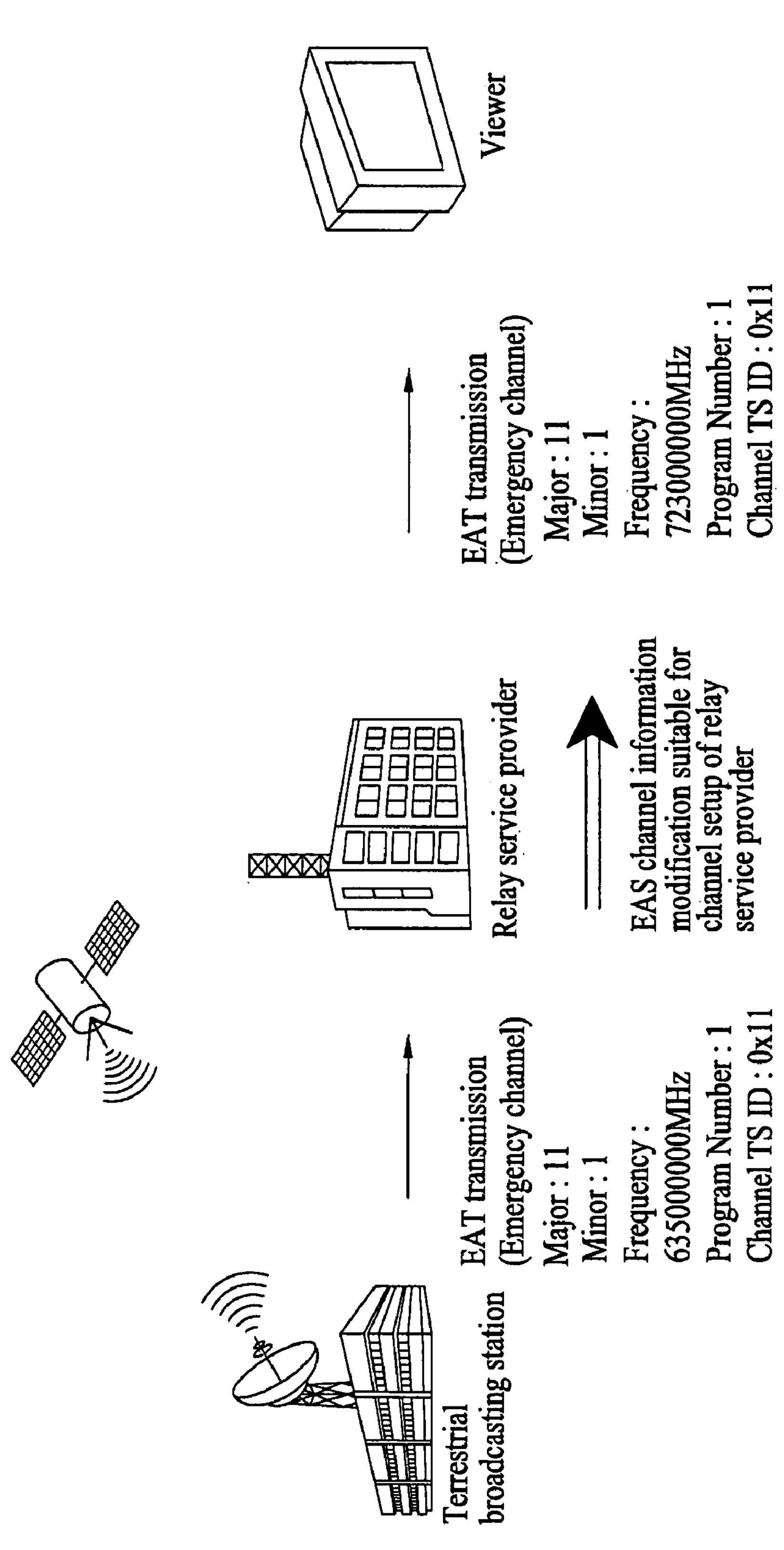
FIG. 3 is an exemplary diagram of a system, in which a relay service provider transmits EAT based on a predetermined protocol, according to the present invention.

Reference will now be made in detail to the preferred embodiments of the present invention, examples of which are illustrated in the accompanying drawings. Wherever possible, the same reference numbers will be used throughout the drawings to refer to the same or like parts.

An emergency alert system message can be received via OOB (out of band) by inserting a cable card (CableCARD) in a cable digital TV of North America. If the cable card is not inserted, the emergency alert system message can be received via in-band.

A digital TV checks whether the received emergency alert system (EAS) message is received via a band different from that for a previously received emergency alert system message. If the received emergency alert system message is received via the band different from that of the previously received emergency alert system message, it is able to omit a redundancy check of the emergency alert system message by clearing a sequence number.

On the other hand, if the received emergency alert system message is received via the same band of the previously received emergency alert system message, the digital TV carries out the redundancy check of the emergency alert system message. If it is a redundant message, the digital TV stops the processing of the emergency alert system message.

After completion of the basic check, the digital TV switches a channel to an emergency alert system channel, on which emergency alert system contents are being broadcasted, according to a priority of the corresponding emergency alert system message.

A number of the channel can be discriminated into an in-band EAS or an OOB EAS according to a reception band of the emergency alert system message.

The emergency alert system message received via in-band can be transmitted by including an emergency alert system broadcast with a pair of a major channel number and a minor channel number. This scheme is possible because there exists a cable broadcasting station as a subject that manages all broadcast channel numbers under North America Cable Broadcasting System.

Yet, in case that the above-explained specification of cable digital broadcasting are applied to a terrestrial broadcasting system as they are, the following problem may rise.

First of all, terrestrial broadcasts received by a terrestrial-receivable digital TV include signals transmitted by different terrestrial broadcasting stations, respectively. A channel number of a channel transmitted by each of the different terrestrial broadcasting stations can be randomly set up according top PSIP (program and system information protocol) standards. Assuming that different broadcasting stations simultaneously use a channel number of a channel on which an emergency alert situation is being broadcasted, a digital TV having received an emergency alert system message (e.g., EAT) has a problem in deciding a channel to switch.

Due to such a problem, it is unable to apply a syntax of an emergency alert system message employed by North American cable digital TV to a terrestrial broadcasting system as it is. Hence, the present invention intends to modify and expand a syntax of EAT to apply specifications of an emergency alert system message used by a cable digital broadcasting system to a terrestrial broadcasting system.

Meanwhile, in order to apply emergency alert broadcast statement identically by considering a broadcasting environment when a terrestrial broadcast is retransmitted via a relay service provider, the present invention is also characterized in that the relay service provider switches to a retransmission channel by searching for a channel corresponding to a received emergency alert system message.

As mentioned in the foregoing description, since all broadcasts in the North American Cable Broadcasting System are managed by cane broadcasting stations, it is able to set broadcast titles or channel numbers arbitrarily. In normal cases, the broadcast titles or channel numbers can be set different from each other.

When a cable broadcasting station transmits an emergency alert system message via in-band, if a priority of the emergency alert system message is high enough to switch to a channel on which an emergency alert situation is being broadcasted, it is facilitated to switch to an emergency alert system broadcast channel by performing channel tuning to a channel corresponding to a received channel number according to SCTE (society of cable television engineers) 18 (more particularly, emergency alert message for cable).

The above-described emergency alert broadcast channel processing method in the conventional North American cable broadcasting system can be processed without special problems since there exits the assumption of protocol indicating that all channel numbers of the receive cable are not overlapped with each other. Yet, if the emergency alert message syntax of the able broadcasting, which is defined by SCTE 18, is applied to a terrestrial broadcasting system as it is, it is not appropriately usable due to the problem of channel overlapping possibility.

Hence, the present invention intends to solve the problem of the overlapped channel occurrence in a manner of compensating/expanding syntax of an emergency alert broadcast message used for a cable broadcasting system.

FIG. 1 is an exemplary diagram of a bit stream syntax of an emergency alert table (EAT) newly defined by terrestrial broadcasting according to the present invention, and FIG. 2 is an exemplary diagram of an EAT channel descriptor (EAT_channel_descriptor) newly defined by terrestrial broadcasting according to the present invention.

EAT (emergency alert table) and EAT channel descriptor (EAT_channel_descriptor), which are newly defined by the present invention, are explained with reference to FIG. 1 and FIG. 2 as follows.

First of all, an emergency alert broadcast message specification of cable broadcasting is defined to enable both of an emergency alert message received via in-band and an emergency alert message received via OOB (out off band) to be processed. Yet, in terrestrial broadcasting, it is unable to receive an emergency alert message via OOB. Hence, the present invention is characterized in defining EAT of a terrestrial broadcasting system, as shown in FIG. 1, in a manner of removing all fields associated with OOB from EAT of a cable broadcasting system. If so, a processing speed for EAT of a terrestrial broadcast can be improved by deleting the unnecessary fields.

Fields shown in FIG. 1 are described in brief as follows. Of course, they can be understood more easily with reference to EAT of cable broadcasting in some cases.

Referring to FIG. 1, a 'table_ID' field is a syntax for indicating an emergency alert message of a terrestrial broadcast. For instance, the 'table_ID' field can be set to 0xD8.

And, "section_syntax_indicator" field can be set to 1. It denotes that the generic MPEG-2 section syntax follows 'section_length' field.

The 'section_length' field defines the number of remaining bytes and shall be set to a value smaller than 4,093.

And, 'sequence_number' field can indicate a sequence of emergency alert message. If a semantic of the message is changed, this field can be incremented by a value 0 to 31. And, this field can indicate a version of the emergency alert message.

"current_next_indicator" field shall always be set to '1' to indicate that the table sent is always currently applicable.

"section number" field indicates that a table sent shall occupy a length of at least one section and can be set to 0x00.

"protocol_version" field indicates a version value of PSIP (Program and System Information Protocol).

"EAS_originator_code" field can indicate an entity having activated EAS (Emergency Alert System). "EAS_event_code_length" field can indicate a length of "EAS_event_code". And, "EAS_event_code" field can indicate a type of EAS. For instance, this field can indicate such a type of emergency as flood, earthquake, terror, etc. together with emergency information such as large-scale earthquake, medium-scale earthquake, small-scale earthquake, etc.

"nature_of_activation_text_length" field can indicate a length of "nature_of_activation_text". For instance, if a value of "nature_of_activation_text_length" field is '0', "nature_of_activation_text" can indicate that the nature_of_activation_text( ) field is not included in this alert message.

"nature_of_activation_text" field may contain a syntax which represents a short textual representation of the event code for on-screen display.

"alert_message_time_remaining" field, which can be set to a unit in the range 0 to 120 seconds, shall indicate the time remaining in the emergency alert system message. A value of zero shall indicate an alert message period of indefinite duration. And, the "alert_message_time_remaining" field can indicate a duration time, which should be sustained until an emergency alert system message turn into an interrupt message returns, by a second unit.

"event_start_time" field represents the start time of this alert event (EAM event) as the number of seconds since 00 hours UTC, Jan. 6, 1980.

Meanwhile, according to a time comparison to an STT time of a corresponding channel with reference to GPS time, in case of a past time, a terrestrial broadcast receiver ignores the EAT. In case of a future time, it can decided whether to load the EAT in a memory of the terrestrial broadcast receiver by comparison to a value of "event_duration". And, the "event_duration" field, when nonzero, represents the number of minutes the alert is expected to last. A value of zero indicates that the event duration is unknown (indefinite).

And, the terrestrial broadcast receiver can delete the no-longer useful previous emergency alert event stored in the memory of the terrestrial broadcast receiver using "event_start time" and "event_duration" fields.

"alert_priority" field may mean a syntax indicating a priority or significance of an emergency alert.

"alert_text_length" field indicates the number of total bytes of "alert_text( )" field. A value of zero indicates the alert_text( ) field is not included in this alert message. And, the "alert_text( )" field may have a data structure containing a multiple_string_structure( ) which shall represent a textual description of the emergency alert for OSD (on-screen display). And, the emergency alert text can be set to be slowly scrolled bottom to top or right to left on a screen of the terrestrial broadcast receiver (Receiving devices scroll alert text slowly across the top of the video screen, from right to left).

"location_code_count" field can be set to an 8-bit unsigned integer number in the range 1 to 31 that shall represent the number of region definitions to follow in the "for" loop. Yet, in the region definitions, the regional names according to administrative district discrimination in U.S.A. are exemplarily used, which does not restrict the scope of the appended claims and heir equivalents of the present invention.

"state_code" field can be set to an 8-bit unsigned number in the range 0 to 99 that represents the State, Territory or Offshore (Marine Area) affected by the emergency alert. The "state_code" field shall be coded according to State and Territory FIPS number codes. The value of 0 shall indicate all states, or a national level alert.

"state_subdivision_code" field can be set to a number in the range 0 to 99. And, "county_code" field represents a specific county of the state relevant to an emergency and can be set to a number in the range 0 to 99. The "county_code" field can be coded according to FIPS number codes of a state and area. If the field is set to 0, it can indicate that all counties are in emergency.

"exception_major_channel_number" field is able to represent a major channel number of an exception service in association with in-band SI.

And, "exception_minor_channel_number" field can represent a minor channel number of an exception service in association with in-band SI if it is not set to 0.

Specifically, in the present invention, new fields required for channel tuning are defined in the descriptor shown in FIG. 1 to solve the overlapping problem of channel number. An EAT channel descriptor (EAT_channel_descriptor) proposed by the present invention is shown in FIG. 2. The name of the EAT channel descriptor is just exemplary. The EAT channel descriptor is explained in detail as follows.

First of all, "descriptor_tag" field is an field that identifies whether a corresponding descriptor is an EAT channel descriptor and can be set to '0xEA' for example.

"descriptor_length" field can be used to represent a length or size of a corresponding descriptor.

"details_major_channel_number" field represents a major channel number for broadcasting an emergency alert broadcast. And, "details_minor_channel_number" field represents a minor channel number for broadcasting an emergency alert broadcast.

"carrier_frequency" field identifies a frequency for transmitting an emergency alert broadcast and "details_channel_programNumber" field identifies a program number within the frequency for transmitting the emergency alert broadcast.

And, "details_channel_tsID" field can be used as a field that identifies a transport stream ID for transmitting broadcast contents.

Namely, the present invention is characterized in defining channel number information of terrestrial broadcasting for transmitting an emergency alert broadcast in an EAT channel descriptor (EAT_channel_descriptor) to enable each terrestrial broadcasting station to be discriminated in accordance with a preset reference.

The channel number information can be determined via the "details_major_channel_number" and "details_minor_channel_number" fields.

Meanwhile, the present invention is also characterized in defining frequency information of terrestrial broadcasting for transmitting an emergency alert broadcast in an EAT channel descriptor to enable each terrestrial broadcasting station to be discriminated in accordance with a preset reference.

The channel number information can be determined via the "carrier_frequency" field.

Thus, in case that the EAT channel descriptor shown in FIG. 2 is added to an EAT of a terrestrial broadcast signal, it is able to remove the program number overlapping within a frequency. Hence, it is able to define a channel, which carries an emergency alert broadcast without the channel overlapping occurrence, in EAT.

FIG. 3 is an exemplary diagram of a system, in which a relay service provider transmits EAT using a predetermined protocol, according to the present invention.

A method of transmitting an EAT, if a relay service provider retransmits a terrestrial broadcast, is explained with reference to FIG. 3 as follows.

First of all, in case that a terrestrial broadcast is retransmitted via a relay service provider, a frequency of a corresponding terrestrial channel is changed. So, it is highly probable that the emergency alert message format (e.g., EAT channel descriptor) of the terrestrial broadcasting system defined in FIG. 1 and FIG. 2 may not perform channel switching to a correct channel.

Hence, the present invention proposes a technical feature that, if a relay service provider receives a terrestrial emergency alert system message, channel information within the EAT channel descriptor shown in FIG. 2 is modified into a frequency form for a relay transmission to prepare for a case that a terrestrial channel is retransmitted by the relay service provider.

The terrestrial relay service provider may perform retransmission by mixing cable channel, satellite channel, terrestrial channel and the like together without using a terrestrial frequency transmitted by a terrestrial broadcasting station. In this case, it is highly probable that the frequency transmitted by the terrestrial broadcasting station may not be used due to the problem of the overlapping with another channel.

In case that a relay service provider, as shown in FIG. 3, modifies and transmits an emergency alert system content transmitted by a terrestrial broadcasting station, a frequency is modified by a predetermined protocol instead of being randomly modified.

For instance, preset is a mapping protocol for meaning a specific terrestrial broadcasting station in case that frequency information of EAT transmitted by a terrestrial broadcasting station is 635,000,000 MHz and in case that frequency information of EAT retransmitted by a relay service provider is 723,000,000 MHz.

If the mapping protocol is followed, it is able to prevent error from occurring in channel information initially provided by a terrestrial broadcasting station even if a relay service provider retransmits a terrestrial broadcast having been received from the terrestrial broadcasting station.

Figure 4:
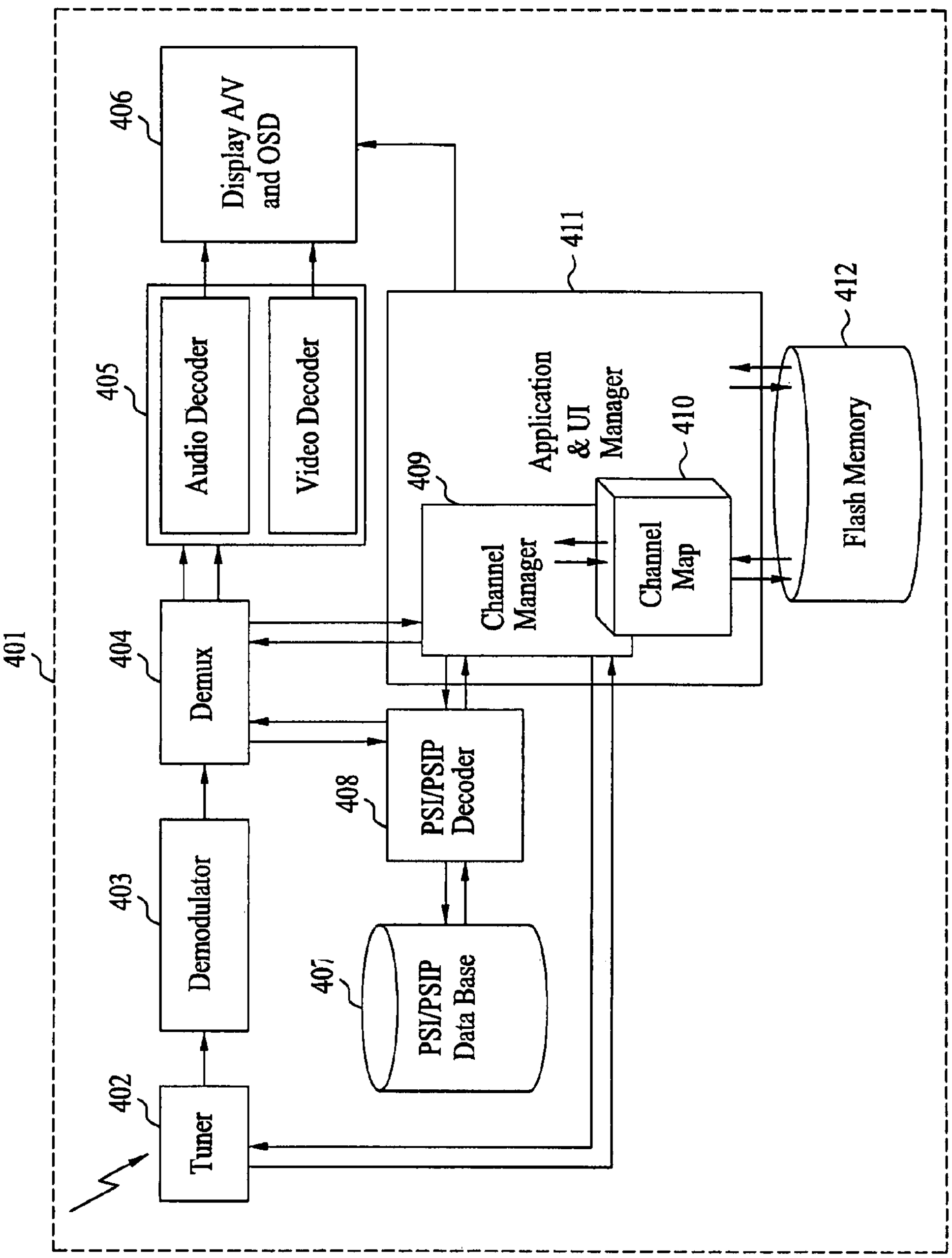
FIG. 4 is a block diagram of a broadcast receiver for receiving and processing EAT according to the present invention.

FIG. 4 is a block diagram of a broadcast receiver for receiving and processing EAT according to the present invention.

An operation of a broadcast receiver, which receives and processes an EAT channel descriptor, according to the present invention is explained with reference to FIG. 4 as follows.

Referring to FIG. 4, a broadcast receiver 401 according to the present invention includes a tuner 402, a demodulator 403, a demultiplexer 404, an A/V decoder 405, a display unit 406, a PSI/PSIP database 407, a PSI/PSIP decoder 408, a channel manager 409, a channel map 410, an application and UI manager 411, a flash memory 412, and the like. In this case, the broadcast receiver 401 means a digital television (DTV) capable of terrestrial broadcast reception or the like for example.

The tuner 402 is able to receive a terrestrial broadcast signal containing a PSI/PSIP (program and system information/program and system information protocol) table. For instance, the PSIP table can include an emergency alert table (EAT) and the like. And, operations of the tuner 402 can be controlled by the channel manager 409. Moreover, the tuner 402 enables a result from receiving the terrestrial broadcast signal to be recorded back in the channel manager 409.

The demodulator 403 demodulates a signal tuned by the tuner 402 by VSB/EVSB (vestigial sideband/enhanced vestigial sideband) demodulation.

The demultiplexer 404 plays a role in demultiplexing audio data, video data, and PSI/PSIP table data from the signal demodulated by the demodulator 403. In this case, the audio/video data demultiplexing can be controlled by the channel manager 409, whereas the PSI/PSIP table data demultiplexing can be controlled by the PSI/PSIP decoder 408.

The demultiplexed PSI/PSIP table is transferred to the PSI/PSIP decoder 408, while the demultiplexed audio/video data are transferred to the A/V decoder 405. The A/V decoder 405 is then able to decode the transferred data.

The PSI/PSIP decoder 408 parses a PSI/PSIP section, reads the entire rest of actual section data failing to be section-filtered by the demultiplexer 404, and then records the data in the PSI/PSIP database 407.

And, the PSI/PSIP decoder 408 is capable of parsing EAT information contained in the PSI/PSIP. Using channel information and the like contained in the parsed EAT information, the channel manager 409 controls the tuner 402 to be tuned to a channel of a terrestrial broadcast that carries emergency alert news.

Meanwhile, the EAT can include the EAT channel descriptor shown in FIG. 2, which has been sufficiently explained in the descriptions of FIG. 1 and FIG. 2. And, it is apparent to those skilled in the art that a DTV for processing the EAT can be designed through FIG. 1 and FIG. 2.

Figure 5:
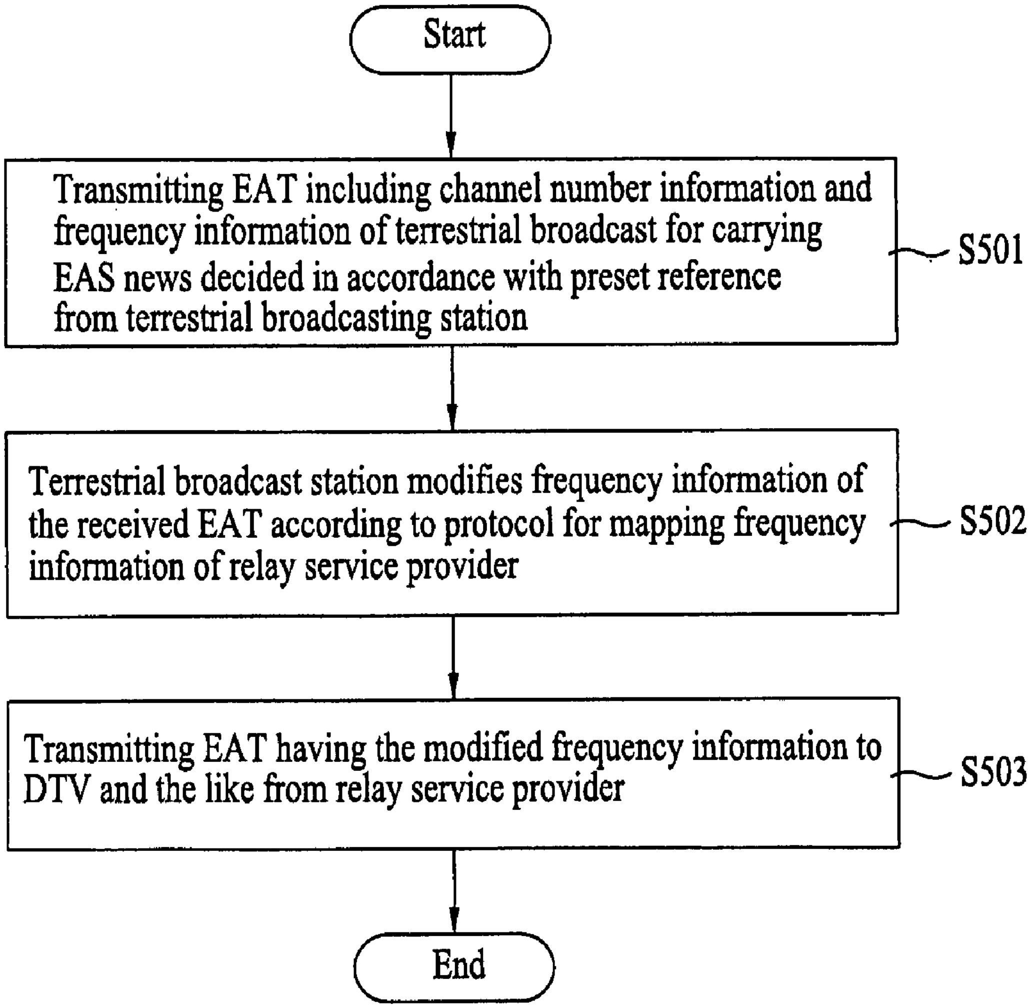
FIG. 5 is a flowchart of a process for controlling an EAT transmission according to the present invention.

FIG. 5 is a flowchart of a control method of transmitting an EAT according to the present invention. A method of transmitting an EAT according to the present invention is explained with reference to FIG. 5 as follows. In particular, FIG. 5 schematically depicts the descriptions for FIGS. 1 to 4 in accordance with a time flow, of which details will be omitted in the following description.

Referring to FIG. 5, an EAT, which includes channel number information of a terrestrial broadcast carrying emergency alert news and frequency information, decided in accordance with a preset reference is transmitted by a terrestrial broadcasting station (S501). And, the present invention is characterized in designing the channel number information and the frequency information to be defined in a descriptor (EAT_channel_descriptor) of the EAT.

Subsequently, a relay service provider modifies the frequency information of the received EAT in accordance with a protocol for mapping frequency information of the terrestrial broadcasting station to frequency information of the relay service provider (S502).

The relay service provider then transmits an EAT having the modified frequency information to a DTV and the like (S503).

Accordingly, the present invention provides the following effects or advantages.

First of all, information on a channel for carrying emergency alert news can be completely prevented from being overlapped with information on other general channels in a terrestrial broadcasting environment.

Secondly, an initially intended channel carrying emergency alert news can be substantially tuned to in case of an emergency occurrence in a manner that frequency information on a channel carrying emergency alert news is designed to be modified in accordance with a predetermined reference despite that a relay service provider retransmits an emergency associated broadcast signal (e.g., EAT, etc.) having been transmitted by a terrestrial broadcasting station It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a digital broadcasting signal, the method comprising:

receiving the digital broadcasting signal including an emergency alert table, wherein the emergency alert table includes a descriptor, and the descriptor includes frequency information of an emergency alert channel and program number information of the emergency alert channel; wherein the emergency alert table further includes details_major_channel_number, details_minor_channel_number, exception_major_channel_number, and exception_minor_channel_number;

parsing the frequency information and the program number information from the descriptor of the emergency alert table; and tuning to the emergency alert channel in accordance with the parsed frequency information and the program number information.

2. The method of claim 1, wherein the descriptor further includes major channel number information of the emergency alert channel and minor channel number information of the emergency alert channel.

3. The method of claim 1, wherein the descriptor further includes channel transport stream ID information of the emergency alert channel.

4. The method of claim 1, wherein the frequency information identifies a carrier frequency band of the emergency alert channel.

5. A digital broadcast receiver comprising:

a tuner configured to receive the digital broadcasting signal including an emergency alert table, wherein the emergency alert table includes a descriptor, and the descriptor includes frequency information of an emergency alert channel and program number information of the emergency alert channel; wherein the emergency alert table further includes details_major_channel_number, details_minor_channel_number, exception_major_channel_number, and exception_minor_channel_number;

a decoder configured to parse the frequency information and the program number information from the descriptor of the emergency alert table; and a controller configured to control the tuner to tune to the emergency alert channel in accordance with the parsed frequency information and the program number information.

6. The digital broadcast receiver of claim 5, wherein the descriptor further includes major channel number information of the emergency alert channel and minor channel number information of the emergency alert channel.

7. The digital broadcast receiver of claim 5, wherein the descriptor further includes channel transport stream ID information of the emergency alert channel.

8. The digital broadcast receiver of claim 5, wherein the frequency information identifies a carrier frequency band of the emergency alert channel.

* * * * *